Figure 3:
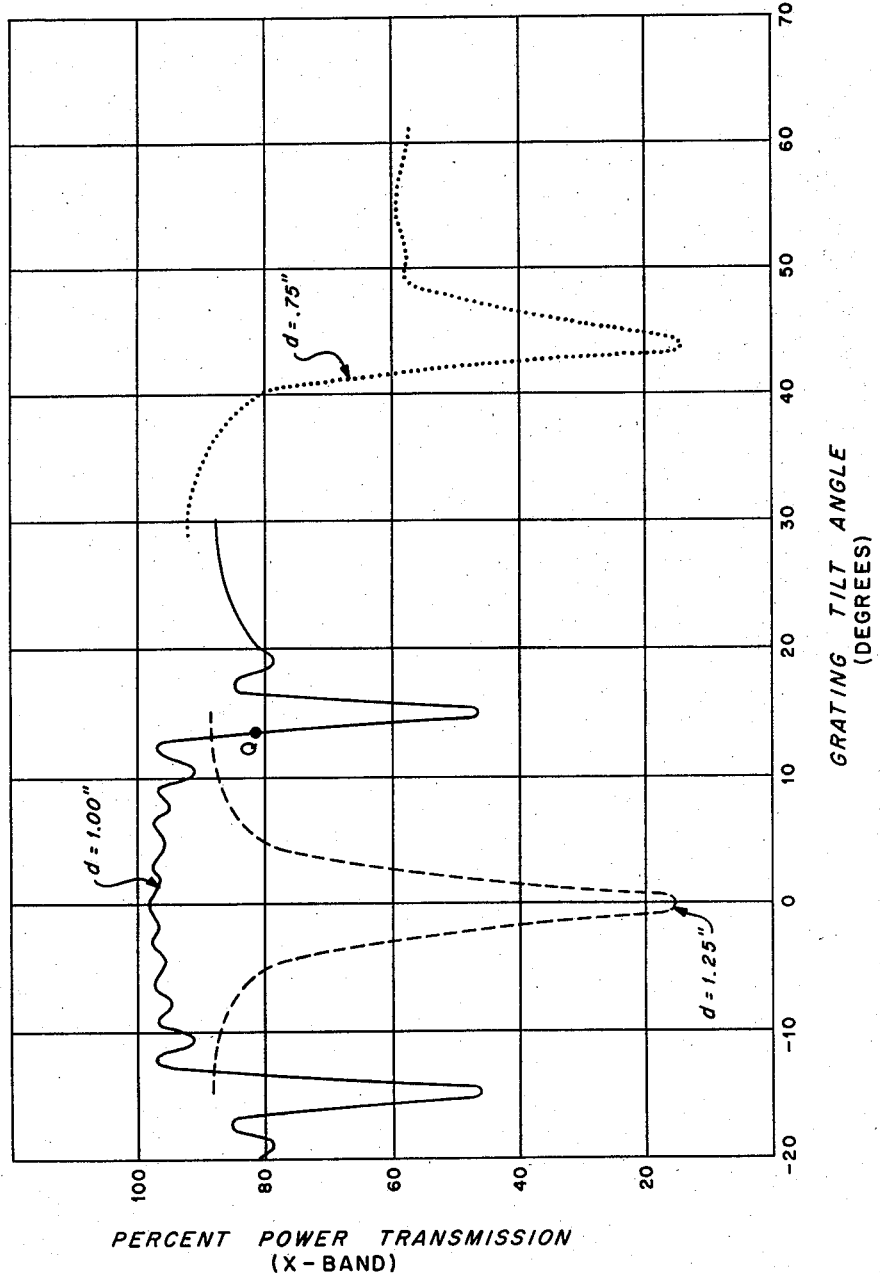

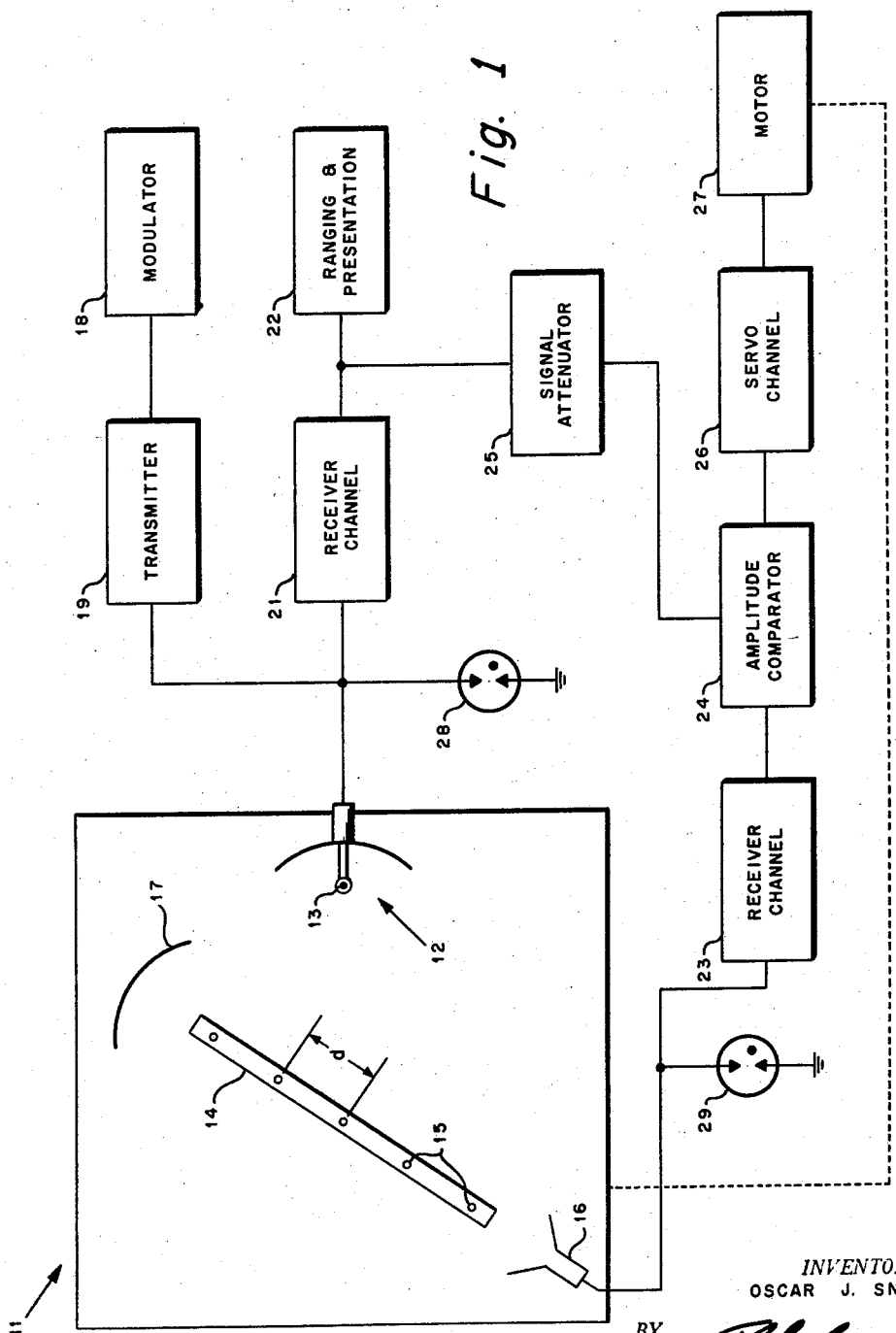

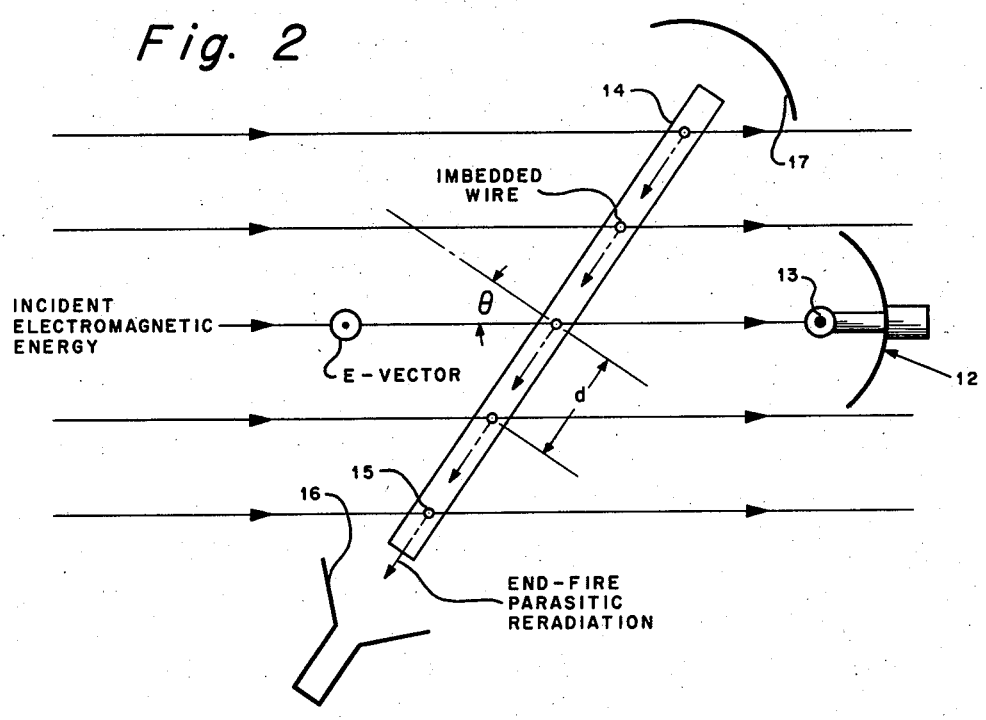
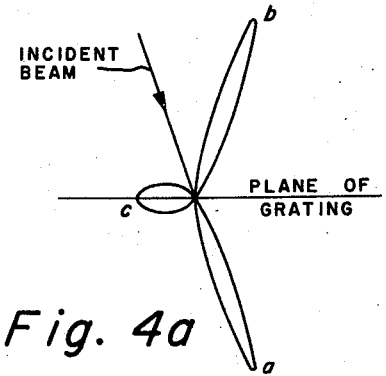
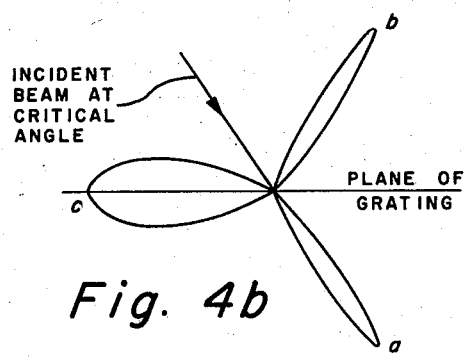
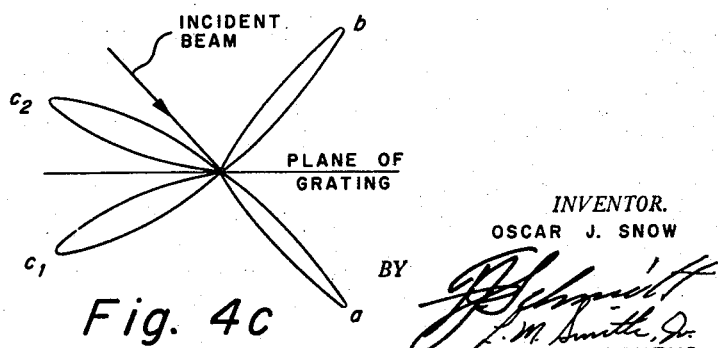

INVENTOR.
OSCAR J. SNOW

United States Patent Office
2,885,666
Patented May 5, 1959

2,885,666

AUTOMATIC TRACKING SYSTEM FOR A RADAR OR MICROWAVE RECEIVING SYSTEM

Oscar J. Snow, Philadelphia, Pa., assignor to the United States of America as represented by the Secretary of the Navy Application June 12, 1957, Serial No. 665,362

14 Claims. (Cl. 343—7.4)

(Granted under Title 35, U.S. Code (1952), sec. 266)

The invention described herein may be manufactured and used by or for the Government of the United States of America for governmental purposes without the payment of any royalties thereon or therefor.

The present invention relates to an automatic tracking system and more particularly to an automatic tracking system for a radar or microwave receiving system in which an inclined wire grating is employed as a refractory parasitic antenna element.

A prevailing method for performing the function for which the present invention is intended utilizes a microwave dish or feed, whereby either is eccentrically rotated so that a scanning beam is generated. In this manner, directional information is obtained with respect to the phase of the received signal, resulting from the modulation in effect imparted by the scanning beam. This method possesses inherent disadvantages for the reason that the target scintillation noise is increased, in addition to the fact that the mechanical scanning means is subject to undesirable wear, inevitably contributing to inferior system operation. Another existing method utilizes two or more receiver horns or dishes slightly off-axis relative to each other whereby directional information is obtained by comparing the sum and difference of the signals received by the respective antennas. This type has a disadvantage that the method of signal processing for correction of the tracking error is relatively complex, notwithstanding the fact that tracking accuracy of such a system is inherently limited.

The instant invention provdies a novel concept in achieving automatic tracking in a radar or microwave receiving system, greatly obviating the enumerated limitations and disadvantages of the prior art. The inventive principle on which the instant invention is based has its origin in the transmission characteristics of an inclined wire grating, which is interposed between a microwave radiating source and a receiving antenna. Sharp and intense absorption phenomenon is manifested over a narrow range of wire grating tilt angles. In this region, the parasitic reradiation maxima lay in the end-fire direction of the wire grating, consequently resulting in a division of the oncoming electromagnetic energy. Two separate antenna channels are provided for relative comparison of the amplitudes of the two received signals, electrical information being subsequently resolved for application to a servo system such that the seeker head of the radar or microwave system will "lock on" in the direction of the received radiation. Thus, in the manner summarily described, the instant invention not only provides a sensitive means for denoting the declination of the radiation source from the axis of the seeker head, but also obviates the use of mechanical scanning devices.

An object of the present invention is the provision of an automatic tracking means in a radar or microwave receiving system.

Another object is to provide an automatic tracking means in a radar system whereby use of a mechanical scanning means is obviated.

A further object of the invention is the provision of automatic tracking means which is independent of the character of the incident microwave energy emanating from a source.

Still another object is to provide an automatic tracking means in a radar system whereby the target tracking error is a minimum.

A final object of the present invention is the provision of passive automatic tracking means in a microwave receiving system whereby the microwave energy radiating from a target and assimilated in the inventive automatic tracking means originates from another radar remotely located from the microwave receiving system.

The exact nature of this invention as well as other objects and advantages thereof will be readily apparent from consideration of the following specification relating to the annexed drawing in which:

Fig. 1 presents in a semi-schematic block diagram form a preferred embodiment of the automatic tracking means incorporated in a radar system, Fig. 2 illustrates a plan view of pertinent elements of the seeker head in relative orientation with respect to the incident electromagnetic radiation and reradiated energy in the end-fire direction, Fig. 3 presents experimental transmission curves for various wire grating parameters, showing a particular percentage power transmission or received incident energy in the X-band region as a function of grating tilt angle, and Figs. 4a, 4b and 4c portray approximate parasitic radiation patterns for an inclined wire grating wherein the grating tilt angle is varied through the critical angle.

Referring now to the drawings, wherein like reference characters designate like or corresponding parts throughout the several views, there is shown in Fig. 1 a preferred embodiment of the instant invention integrally incorporated in a pulse-type radar system to provide the specific function of automatic tracking. Numeral 11 generally designates a platform or base which is rotatable about an axis passing through its center perpendicular to the plane of Fig. 1 and comprises an antenna 12, which may be of an exemplary dish-type as indicated, having a vertically polarized radiating dipole 13, an inclined wire grating panel 14 of dielectric composition, such as for example, laminated Fiberglas or the like, in which vertically polarized wires 15 are imbedded, a receiving antenna 16 which may be of the horn-type as shown, and a reflector 17. The laminated Fiberglas panel 14 in the preferred embodiment of Fig. 1 is comprised of thin layers of Fiberglas cloth bound together with a dielectric binder, such as for example, Laminac P-43 resin, or the like. The laminated panel with the wires imbedded therein is of negligible thickness compared with the wavelength of operation, being of the order of about .044 inch. The composite wire grating panel is interposed at an angle between a microwave radiating source and antenna 12 in the representative manner as illustrated. The length of the vertically polarized wires 15 is noncritical, though for maximum efficiency the length must be sufficient so that a parallel array of these elements will mask or screen the capture area of antenna 12. The diameter of the wires is preferably small compared to the operational wavelength, and may be number 26 to 29 gauge copper wire, already used successfully in practicing the instant invention. The spacing "d" in the preferred embodiment of Fig. 1 is approximately one inch for operation in the X-band, and in general is less than a wavelength. The choice of wire spacing is dependent upon various factors which are discussed subsequently with relation to other figures of the drawing. Antenna 16 is oriented in the manner as portrayed in Fig. 1 relative to the inclined wire grating or array, and its width usually need not exceed that dimension that will subtend an angle of about 20 degrees at the edge of the grating which is farthest removed from the antenna 16. The function of reflector 17 shown in Fig. 1 is to redirect into the main beam the microwave energy incident upon it during the transmission phase of operation of the radar. The configuration of reflector 17 may be paraboloidal though its shape in general will be dictated by whatever pattern characteristics are desired to be accentuated in the main beam.

In the illustrative embodiment of the instant invention, a modulator 18 is employed in a conventional manner to pulse transmitter 19, which thereby causes a burst of microwave energy to be emanated from radiating dipole 13. Transmit-receive (T–R) boxes 28 and 29, employing a glow discharge tube, short the inputs to receiver channels 21 and 23, respectively, on the transmission phase of the radar. The T–R box in each instance, is located a quarter wavelength from the receiver input so that upon ionization of the glow discharge tube, a high impedance is presented at the input of the associated receiver channel. Ranging and presentation designated by numeral 22 is provided by conventional means known in the art, and no further delineation thereof is deemed necessary since the manner of ranging and presentation is not directly related to the inventive automatic tracking function. Signal attenuator 25 provides a variable calibration means, which may be a simple potentiometer or other type of insertion loss impedance operable on the signal to permit minor adjustment during tracking, necessary to maintain correct alignment during "on" target conditions. Amplitude comparator 24 functions to compare the respective signals of receiver channels 21 and 23, and may be a difference amplifier having in the output thereof the algebraic difference of the two input signals. The servo channel 26 is conventional and embraces electrical elements in an amplifier circuit responsive to the difference voltage output of amplitude comparator 24. A modulator-amplifier circuit using varistors may be conveniently employed in a conventional manner to convert this difference voltage into a sinusoidal signal of proper phase and amplitude, if design criteria compel that motor 27 be of an A.-C. type. Alternatively, motor 27 may be of a D.-C. type, in which case its shunt field may be expeditiously supplied from the push-pull output circuit of servo channel 26. The above designated means are merely illustrative elements for performing the servo function. Mechanical coupling is denoted by the dashed line between the rotatable seeker head 11 and motor 27.

Fig. 2 presents in a plan view the pertinent elements of the seeker head with relation to the incident electromagnetic radiation and reradiated energy in the end-fire direction. With the configuration as therein portrayed, antenna 12 points in the general direction of a radiating source, and the inclined wire grating 14 during normal automatic tracking operation thereof is maintained approximately at a grating tilt angle $\theta$ with respect to the incident electromagnetic energy, depicted herein with the E-vector perpendicular to the plane of Fig. 2, and in general parallel relationship with dipole 13 and the vertically polarized elements 15. The grating tilt angle $\theta$ is primarily a function of the spacing $d$, and has been chosen in the instant invention to be approximately 15 degrees, the absorption phenomenon of the array being most pronounced at this critical angle. The end-fire parasitic radiations indicated by the vectors in the plane of the wire grating are a maxima at this angle and at the same time the energy incident upon the receiver dish 12 exhibits a sharp and intense transmission dip, accentuated by interference effect. Thus, it is this significantly particular manifestation upon which the inventive automatic tracking apparatus of the instant invention is based. The fractionated microwave radiation is respectively received at antennas 12 and 16, and a variation from a predetermined ratio of the received intensities is used as a measure of tracking error or deviation from the radiating source.

An insight in the absorption characteristics denoted above may be obtained from the experimental curves plotted in Fig. 3. The graph depicts percentage power transmission or microwave energy received by antenna 12 versus grating tilt angle for three different wire grating panels, each with different wire spacings. For simplicity and presentation, only regions of curves where the variation in transmission is marked are included. The curves are in all cases approximately symmetrical about the zero tilt position. Further, it is to be noted that the dielectric panels, per se, exhibit no absorption maxima of their own; thus, the transmission minima may be attributed, primarily, to the effect of wires alone.

For the case of 1.25 inch wire spacing, that is, approximately one wavelength at X-band frequencies, it may be observed in Fig. 3 from the dashed line curve that a single major dip occurs at normal incidence. This particular curve as well as the dotted curve representative of the three-quarter inch spacing, are of academic interest in the instant invention, since a desideratum compels the location of an operating point on a portion of a curve which has the steepest slope. As the wire separation decreases from one wavelength, the single major dip indicated at normal incidence appears to split into two minima as is evidenced by the solid line curve for a one inch separation. Here, there are major dips in the neighborhood of $\pm 15$ degrees along with a number of minor variations. When the wire separation is reduced to three-quarter inch, the principal minima have moved to approximately $\pm 44$ degrees, as indicated by the dotted line curve. Referring to Fig. 3, it may be seen that these major dips occur at tilt angles which are given, very nearly, by the formula: $\sin^{-1}(\lambda/d - 1)$ where $\lambda$ is the wavelength and $d$ is the wire separation, previously defined. It is immediately apparent that this is also the condition at which the array would be expected to reradiate parasitically in a reverse end-fire direction. In other words, the apparently absorbed energy is reradiated in an end-fire direction when the tilt angle reaches the proper value for this manifestation to occur. This relationship is graphically illustrated with greater particularity in Fig. 4. A designated point "Q" is arbitrarily selected as an illustrative operating point for normal tracking operation of the inventive automatic tracking apparatus. It will be observed that the slope of the solid line curve within the critical angular region of point Q is very steep, permitting sharp discrimination between respective receiver channel signals during "off" target conditions. Thus, an incrementally large servo error is developed for an infinitesimal deviation of the axis of antenna 12 and of seeker head 11 from the target.

With respect to the approximate pattern illustration in Figs. 4a, 4b and 4c, a simple theory upon which these patterns are based postulates that the total impedance of each wire is invariant with the tilt angle and that the current peak amplitude is identical and uniform over all the wire elements of the array. Hence, a plot of the approximate pattern based upon this assumption is computed for three difference incident beam directions, for the case where the wire spacing is one inch, as in the illustrative embodiment of Fig. 1. Note that only reradiated energy is considered here, and that the large effect of the main beam is not shown. It will be observed that radiation peaks are found in the principal transmission or incident beam directions noted by lobes "a" in Figs. 4a, 4b and 4c, in addition to lobes noted by "b" which are peaked in the specular reflection directions. The absolute intensities of these lobes, as well as their width, change comparatively slowly with changing incident direction, still assuming that the wire current peak amplitudes do not change with incident direction. In the pattern shown in Fig. 4a the incident or tilt angle is appreciably less than 15°, a condition for which the measured transmission is well above 90 percent as indicated in Fig. 3, with only minor transmission dips occurring. From the antenna array formula it can easily be shown that, with this condition, the only significant lobe other than those in the main transmission and specular reflection directions is lobe "c" which points in an end-fire direction, coincident with the plane of the grating. The amplitude of this lobe grows but remains relatively small until the critical angle of incident beam direction, in this case 15°, is approached. The pattern in Fig. 4b represents the case where the incident beam direction is exactly this critical value. Here the end-fire lobe has grown rapidly to its maximum value, and while its amplitude is identical to that of the other two lobes, as given by the antenna array formula, its width is considerably greater, thereby representing a decidedly greater quantity of power. As the incident beamed direction angle exceeds the critical angle, the lobe "c" splits into two separate lobes, represented by "$c_1$" and "$c_2$" as portrayed in the pattern of Fig. 4c. The two lobes maintain the same amplitude as the others, however, their widths are sufficiently small so that the energy which they represent is significantly less than the energy represented by lobe "c" in the pattern of Fig. 4b. Consequently, a receiving element such as antenna 16 disposed in prolongation with the wire grating array, will be effective to intercept the energy in the end-fire lobe, the reradiated power being proportional to the integral of its power antenna array pattern. The power contained in the lobe coincident with the main beam and in the specular reflection lobe may be ignored, since in comparison with that of the end-fire lobe, this power is negligible. In addition, these specific lobes are shown somewhat exaggerated for illustrative purposes.

The dynamic operation of the automatic tracking means of the instant invention can best be delineated with respect to the showing in Fig. 1. Assuming that operation is within a critical angular region encompassing the designated point Q in Fig. 3, the dominant proportion of microwave energy will impinge on antenna 12, which is oriented in the general direction of the radiating source. In accordance with inventive principles, a lesser amount of microwave energy is reradiated in the end-fire direction and falls upon antenna 16. Hence, receiver channels 21 and 23 are presented input signals, the magnitudes of which vary in an instantaneous reciprocal manner, not unlike push-pull operation, according to the deviations of the axis of antenna 12 and of the seeker head 11 from the target or radiating source. Signal attenuator 25 permits a calibration adjustment of the ratio of received intensities of the respective signals. For example, for "on" target conditions, it is desirable to have coincidence between the optical and electrical axes of antenna 12, in which case attenuator 25 is adjusted to permit a ratio of received intensities having a value of unity, or that is to say, the signals to the amplitude comparator stage 24 are equal. The output of comparator 24 is subsequently converted in servo channel 26 into an appropriate electrical signal of proper phase and amplitude, and thence supplied to motor 27 to precisely rotate seeker head 11 in a direction to nullify the servo tracking error signal, which caused the corrective action to take place initially. An astute observation of Fig. 3 will show that operation is possible on the solid curve at points other than point Q. However, the substantially higher value of derivative at the selected operating point dictates that other modes of operation are extremely unlikely. Reflector 17, as hereinbefore stated, functions to redirect into the main beam the microwave energy incident thereon during pulsing of the radar. The wire grating array will be observed to have an end-fire maxima adjacent the end nearest reflector 17 during the transmission phase of the radar.

Thus, the instant invention presents a novel concept for achieving automatic tracking of a target. The inventive apparatus is independent of the character of incident microwave energy emanating from a radiating source, and in this respect a radar or microwave receiving system incorporating the instant invention may be passively operated thereby. In addition, a sensitive automatic tracking means is provided, whereby the objectionable properties of mechanical scanning devices are completely avoided.

It is to be noted that the foregoing description refers to a preferred embodiment of the instant invention, which has been particularly delineated with respect to its applicability in the X-band. The invention may be practiced, of course, in other bands of the frequency spectrum than as specifically denoted. In this respect, it is deemed that a wire grating array may be constructed without resort to use of a laminated Fiberglas supporting panel. It may be desirable, moreover, to delete such supporting structure especially at higher microwave frequencies, wherein the thickness dimension may no longer be a negligible fraction of a wavelength. Such alternative supporting structure may partake of a simple frame upon which may be continuously wound the wire grating, in accordance with inventive principles. Furthermore, the device as thus far described will track only in one plane, and in the construction set forth, it is of use principally for surface to surface operations, but not exclusively so. The radiation beam width is a plane at right angles to the wires is essentially unaffected by the wires, and is thus determined only by the aperture dimension in that plane. Consequently, the inventive automatic tracking apparatus is readily adaptable to tracking applications in two planes by using two wire grids crossed at right angles to each other cooperating in a corresponding manner with a secondary antenna placed perpendicularly to the plane of Fig. 1 to receive end-fire radiation. In order to accommodate such operation in a horizontal plane of polarization, it is necessary to provide a second dipole, horizontally disposed, in the radar antenna together with a suitable feed connected thereto.

It should therefore be understood, of course, that the foregoing disclosure relates to only a preferred embodiment of the invention and that numerous modifications or alterations may be made therein without departing from the spirit and the scope of the invention as set forth in the appended claims.

What is claimed is:

1. An automatic tracking system comprising, in combination, a generally planar platform means disposed for rotation about an axis passing through the center thereof perpendicular to the plane of the platform means, a first directive antenna means fixedly mounted onto said platform means and oriented in a direction to receive electromagnetic radiation emanating from a remote source, parasitic antenna means mounted frontally of said first antenna means onto the platform means to effect reradiation of a portion of incident electromagnetic radiation emanating from the remote source, a second directive antenna means mounted onto the platform means and positioned adjacent the parasitic antenna means in a direction to receive the reradiation from the parasitic antenna means, a first receiver channel means and a second receiver channel means electrically connected to said first and said second antenna means, respectively, comparison means jointly responsive to said first and second receiver channel means for developing in the output of said comparison means a signal proportional to the deviation of said platform means from the remote electromagnetic radiating source, and servo means responsive to the output of said comparison means and mechanically coupled with said platform means, whereby said servo continuously drives said platform means in a direction to reduce said deviation to a minimum.

2. An automatic tracking system comprising, in combination, a generally planar platform means disposed for rotation about an axis passing through the center thereof perpendicular to the plane of the platform means, a first directive antenna means fixedly mounted on said platform means in a direction for operably receiving electromagnetic radiation emanating from a remote source, a wire grating array means of substantially planar configuration mounted frontally of said antenna means onto the platform means to effect end-fire reradiation when said electromagnetic radiation is incident on the array means, a second directive antenna means mounted onto the platform means adjacent the array means and aligned substantially with the plane of the array means to receive the end-fire reradiation, a first receiver channel means and a second receiver channel means electrically connected to said first and said second antenna means, respectively, comparison means connected to said first and said second receiver channel means and responsive to develop a signal proportional to the difference in magnitudes between said radiation and said end-fire reradiation, and a servo system responsive to the output of said comparison means and mechanically coupled with said platform means, whereby said servo rotatably drives said said platform means in a direction to reduce said signal constituting a tracking error signal to a minimum.

3. An automatic tracking system comprising, in combination, a generally planar platform means disposed for rotation about an axis passing through the center thereof perpendicular to the plane of the platform means, a first directive antenna means including a vertically polarized dipole mounted on said platform means to receive direct electromagnetic radiation emanating from a remote target source, a wire grating array means of substantially planar configuration mounted frontally of said first directive antenna means onto the platform means and operably interposed between the radiating target source and the first antenna means to effect end-fire reradiation of incident electromagnetic radiation, said wire grating array means having a coplanar plurality of vertically polarized parallel elements of length not less than the largest dimension characterizing the first antenna means in the vertical plane of polarization and spaced at intervals less than a wavelength of said electromagnetic radiation to collectively screen the capture area of said first directive antenna means, a second directive antenna means mounted onto the platform means and positioned adjacent the array means in substantial alignment therewith to receive the end-fire reradiation, a first receiver channel means and a second receiver channel means connected to said first and said second antenna means, respectively, amplitude comparison means connected to said first and second receiver channel means and jointly responsive thereto to develop a signal proportional to the difference in magnitudes between the direct radiation and the end-fire reradiation, and a servo system responsive to the output of said comparison means and mechanically coupled with said platform means, whereby said servo rotatably drives said platform means in a direction to reduce said signal constituting a tracking error signal to a minimum.

4. An automatic tracking system comprising, in combination, a generally planar platform means disposed for rotation about an axis passing through the center thereof perpendicular to the plane of the platform means, a first directive antenna means fixedly mounted on said platform means and oriented in a direction to operably receive direct electromagnetic radiation emanating from a remote source, parasitic antenna means mounted frontally of said first antenna means onto the platform means to effect end-fire reradiation of a portion of the incident electromagnetic radiation emanating from the remote source, a second directive antenna means mounted onto the platform means and positioned adjacent the parasitic antenna means in a direction for receiving the end-fire reradiation from the parasitic antenna means, a first receiver channel means and a second receiver channel means electrically connected to said first and said second antenna means, respectively, signal comparison means connected to said second receiver channel means, coupling means of variable attenuation characteristics operably electrically connected between said first receiver channel means and said signal comparison means, said latter means effective to develop in the output thereof a signal proportional to the difference in magnitudes between the direct radiation and end-fire reradiation, and a servo system responsive to the output of said comparison means and mechanically coupled with said platform means, whereby said servo rotatably drives said platform means in a direction to reduce said signal constituting a tracking error signal to a minimum.

5. An automatic tracking system comprising, in combination, a generally planar platform means disposed for rotation about an axis passing through the center thereof perpendicular to the plane of the platform means, a first directive antenna means including a vertically polarized dipole mounted on said platform means to receive direct electromagnetic radiation emanating from a remote target source, a wire grating array means of substantially planar configuration mounted frontally of said directive antenna means onto the platform means and operably interposed between the radiating target source and the first directive antenna means to effect end-fire reradiation of incident electromagnetic radiation, said wire grating array means having a coplanar plurality of vertically polarized parallel elements of length not less than the largest dimension characterizing the first directive antenna means in the vertical plane of polarization and spaced at intervals less than a wavelength of said electromagnetic radiation to collectively screen the capture area of said first directive antenna means, a second directive antenna means mounted onto the platform means and positioned adjacent the array means in substantial alignment therewith to receive the end-fire reradiation, a first receiver channel means and a second receiver channel means electrically connected to said first and said second antenna means, respectively, signal comparison means connected to said second receiver channel, coupling means of variable attenuation characteristics operably electrically connected between said first receiver channel means and said signal comparison means, said latter means effective to develop in the output thereof a signal proportional to the difference in magnitudes between the direct radiation and the end-fire reradiation, and a servo system responsive to the output of said comparison means and mechanically coupled with said platform means, whereby said servo rotatably drives said platform means in a direction to reduce said signal constituting a tracking error signal to a minimum.

6. In an automatic tracking system for tracking a radiating target source, a generally planar platform means disposed for rotation about an axis passing through the center thereof perpendicular to the plane of the platform means, a first directive antenna means fixedly mounted onto said platform means and oriented in a direction with the electrical axis thereof operably aligned substantially coincident with the target tracking axis of the platform means to operably receive direct electromagnetic radiation emanating from a target source, parasitic antenna means mounted frontally of said first directive antenna means onto the platform means operably interposed between the radiating target source and the first directive antenna means to effect end-fire reradiation of incident electromagnetic radiation, and a second directive antenna means mounted onto the platform means and positioned adjacent the parasitic antenna means to receive said end-fire reradiation from the parasitic antenna means, whereby the ratio of direct radiation and end-fire reradiation respectively received by said first and said second antenna means is indicative of tracking error constituting deviation of the target tracking axis of the rotatable platform means from the radiating target source.

7. The apparatus of claim 6 in which the first directive antenna means includes a vertically polarized dipole and said parasitic antenna means comprises a coplanar plurality of vertically polarized parallel elements spaced at intervals less than a wavelength of the electromagnetic radiation and of length not less than the largest dimension characterizing the first directive antenna means in the vertical plane of polarization to collectively screen the capture area of said first directive antenna means.

8. The apparatus of claim 6 in which the first directive antenna means includes a horizontally polarized dipole and said parasitic antenna means comprises a coplanar plurality of horizontally polarized parallel elements spaced at intervals less than a wavelength of the electromagnetic radiation and of length not less than the largest dimension characterizing the first directive antenna means in the horizontal plane of polarization to colectively screen the capture area of said first directive antenna means.

9. In an automatic tracking apparatus comprising a rotatable generally planar platform means disposed for rotation about an axis passing through the center thereof perpendicular to the plane of the platform means, a first directive antenna means including a vertically polarized dipole mounted onto said platform means with the electrical axis thereof oriented substantially in a direction to receive direct electromagnetic radiation emanating from a remote target source, a wire grating array means of substantially planar configuration mounted frontally of said first directive antenna means onto the platform means and inclined at an angle to the electrical axis of the first antenna means substantially equal to $$\sin^{-1}\left(\frac{\lambda}{d}-1\right)$$

where $\lambda$ is the wavelength of radiation and $d$ is the wire separation to effect end-fire reradiation of incident electromagnetic radiation, a second directive antenna aligned with the plane of the grating and positioned onto the platform means adjacent the grating means in a direction for receiving the end-fire reradiation, whereby the proportionate amount of radiation received by each of the antennas is dependent upon the angle of incidence of incoming electromagnetic radiation relative to the plane of the grating means to thereby indicate deviation of the electrical axis of said first antenna means from the remote source.

10. In a radar system, an automatic tracking apparatus therefor comprising, in combination, a generally planar platform means disposed for rotation about an axis passing through the center thereof perpendicular to the plane of the platform means, a first directive antenna means fixedly mounted onto said platform means and oriented in the direction of a remote target for periodically transmitting and receiving electromagnetic radiation, parasitic antenna means mounted frontally of said first antenna means onto the platform means to effect end-fire reradiation of incident electromagnetic radiation, reflector means mounted onto the platform means adjacent the parasitic means to redirect in the direction of said remote target end-fire reradiation occurring during an interval in which the first antenna means is transmitting, a second directive antenna means mounted onto the platform means and positioned adjacent the parasitic antenna means opposite the reflector means to receive end-fire reradiation occurring during an interval in which reflected electromagnetic radiation is being received from said remote target, a first and second receiver channel means electrically connected to said first and second antenna means, respectively, blocking means rendering said first and second receiver channel means inoperative except during intervals between successive transmission periods, amplitude comparison means jointly responsive to said first and second receiver channel means for developing in the output of said amplitude comparison means a signal proportional to the difference in magnitudes between the reflected radiation and the end-fire reradiation, and servo means responsive to the output of said amplitude comparison means and mechanically coupled with said rotatable platform means, whereby said servo means rotatably drives the platform means to reduce said signal constituting a tracking error signal to a minimum.

11. An automatic tracking radar comprising, means for intermittently producing high frequency electromagnetic energy, a rotatable generally planar platform means disposed for rotation about an axis passing through the center thereof perpendicular to the plane of the platform means, a first directive antenna means fixedly mounted onto said platform means and oriented in the direction of a remote target for periodically transmitting and receiving electromagnetic radiation, parasitic antenna means mounted frontally of said antenna means onto the platform means to effect end-fire reradiation of incident electromagnetic radiation, reflector means mounted onto the platform means adjacent the parasitic antenna means to redirect in the direction of said remote target end-fire reradiation occurring during an interval in which the first antenna means is transmitting, a second directive antenna means mounted onto the platform means and positioned adjacent the parasitic means opposite the reflector means to receive end-fire reradiation occurring during the interval in which reflected electromagnetic radiation is being received from said remote target, first and second receiver channel means electrically connected to said first and second antenna means, respectively, blocking means rendering said first and second receiver channel means inoperative except during intervals between successive transmission periods, signal comparison means jointly responsive to said first and second receiver channel means for developing in the output of said signal comparison means a signal proportional to the difference in magnitude between the reflected energy and the end-fire reradiation, ranging and presentation means operably connected to said first receiver channel means, and servo means responsive to the output of said comparison means and mechanically coupled with said platform means, whereby said servo rotatably drives said platform means in a direction to maintain said signal constituting a tracking error signal at a minimum.

12. The automatic tracking radar of claim 11 in which the first antenna means includes a vertically polarized dipole, and the parasitic antenna means comprises a coplanar plurality of vertically polarized parallel elements spaced at intervals less than a wavelength of the incident electromagnetic radiation and of length not less than the largest dimension characterizing the first antenna means in the vertical plane of polarization to collectively screen the capture area of said first antenna means.

13. The automatic tracking radar of claim 11 in which the first antenna means includes a horizontally polarized dipole, and the parasitic antenna means comprises a coplanar plurality of horizontally polarized parallel elements spaced at intervals less than a wavelength of the incident electromagnetic radiation and of length not less than the largest dimension characterizing the first antenna means in the vertical plane of polarization to collectively screen the capture area of said first antenna means.

14. The automatic tracking radar of claim 11 in which the signal comparison means includes a coupling means having adjustable attenuation characteristics electrically operably interposed between said first receiver channel means and the signal comparison means.

No references cited.